(12) United States Patent
Kim et al.

(10) Patent No.: US 11,186,703 B2
(45) Date of Patent: Nov. 30, 2021

(54) PLASTICIZER COMPOSITION AND RESIN COMPOSITION INCLUDING SAME

(71) Applicant: LG CHEM, LTD., Seoul (KR)

(72) Inventors: Hyun Kyu Kim, Daejeon (KR); Yun Ki Cho, Daejeon (KR); Seok Ho Jeong, Daejeon (KR); Mi Yeon Lee, Daejeon (KR); Jeong Ju Moon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/316,962

(22) PCT Filed: Dec. 11, 2017

(86) PCT No.: PCT/KR2017/014486
§ 371 (c)(1),
(2) Date: Jan. 10, 2019

(87) PCT Pub. No.: WO2018/110922
PCT Pub. Date: Jun. 21, 2018

(65) Prior Publication Data
US 2019/0241715 A1 Aug. 8, 2019

(30) Foreign Application Priority Data

Dec. 12, 2016 (KR) .................. 10-2016-0168320

(51) Int. Cl.
| | | |
|---|---|---|
| *C08K 5/12* | (2006.01) | |
| *C08K 5/101* | (2006.01) | |
| *C08K 5/00* | (2006.01) | |
| *C08L 27/06* | (2006.01) | |
| *C08K 5/10* | (2006.01) | |

(52) U.S. Cl.
CPC ............. *C08K 5/12* (2013.01); *C08K 5/00* (2013.01); *C08K 5/0016* (2013.01); *C08K 5/10* (2013.01); *C08K 5/101* (2013.01); *C08L 27/06* (2013.01)

(58) Field of Classification Search
CPC .......... C08K 5/12; C08K 5/0016; C08K 5/00; C08K 5/10; C08K 5/101; C08L 27/06; C07C 67/03; C07C 69/78; C07C 69/82
USPC ........................................................ 524/296
See application file for complete search history.

(56) References Cited

U.S. PATENT DOCUMENTS

| | | |
|---|---|---|
| 7,629,413 B2 | 12/2009 | Godwin et al. |
| 8,088,854 B2 | 1/2012 | Stimpson et al. |
| 8,829,093 B2 | 9/2014 | Dakka et al. |
| 9,534,104 B2 | 1/2017 | Naert et al. |
| 10,287,415 B2 | 5/2019 | Pfeiffer et al. |
| 2007/0179229 A1 | 8/2007 | Grass |
| 2008/0058450 A1 | 3/2008 | Stimpson et al. |
| 2008/0234414 A1 | 9/2008 | Godwin et al. |
| 2010/0048778 A1 | 2/2010 | Godwin et al. |
| 2010/0305255 A1 | 12/2010 | Grass |
| 2013/0310472 A1* | 11/2013 | Becker ............ B32B 5/18 521/73 |
| 2013/0310473 A1 | 11/2013 | Becker et al. |
| 2013/0317152 A1 | 11/2013 | Becker et al. |
| 2014/0213709 A1 | 7/2014 | Dakka et al. |
| 2014/0275376 A1 | 9/2014 | Arendt et al. |
| 2014/0315021 A1 | 10/2014 | Naert et al. |
| 2015/0025185 A1 | 1/2015 | Kim et al. |
| 2015/0025187 A1 | 1/2015 | Arendt et al. |
| 2015/0038625 A1 | 2/2015 | Arendt et al. |
| 2015/0267024 A1* | 9/2015 | Stevens ............ C08J 9/0023 521/73 |
| 2017/0145187 A1 | 5/2017 | Pfeiffer et al. |
| 2017/0313848 A1 | 11/2017 | Pfeiffer et al. |

FOREIGN PATENT DOCUMENTS

| | | |
|---|---|---|
| CN | 101107306 A | 1/2008 |
| CN | 103313847 A | 9/2013 |
| CN | 104961925 A | 10/2015 |
| EP | 2 810 932 | * 12/2014 |
| EP | 2810932 A1 | 12/2014 |
| JP | 2015083690 A | 4/2015 |
| JP | 2016513081 A | 5/2016 |
| KR | 10-2014-005908 A | 1/2014 |
| KR | 10-2014-0027016 A | 3/2014 |
| KR | 10-2014-0131538 A | 11/2014 |
| KR | 10-1465791 B1 | 11/2014 |
| KR | 10-1582699 B1 | 1/2016 |
| KR | 10-2016-0124151 A | 10/2016 |
| TW | 201609628 A | 3/2016 |
| WO | 2014195055 A1 | 12/2014 |
| WO | 2015126391 A1 | 8/2015 |
| WO | 2016055572 A1 | 4/2016 |

OTHER PUBLICATIONS

Office Action of Korean Patent Office in Appl'n No. 10-2020-0112390, dated Nov. 26, 2020.
Office Action of Taiwanese Patent Office in Appl'n No. 106143545, dated Feb. 20, 2021.

* cited by examiner

*Primary Examiner* — Doris L Lee

(74) *Attorney, Agent, or Firm* — Dentons US LLP

(57) ABSTRACT

The present invention relates to a plasticizer composition, which includes a terephthalate-based material in which alkyl groups bonded to a diester group have a weight average carbon number of greater than 7 and less than 9; and a monobenzoate-based material including one or more compounds represented by Chemical Formula 1, wherein a weight ratio of the terephthalate-based material and the monobenzoate-based material is 99:1 to 1:99. Such a plasticizer composition is environmentally friendly, and can also improve properties such as tensile strength, elongation rate, hardness, and the like and migration resistance to stress so as to be suitable for use.

4 Claims, No Drawings

PLASTICIZER COMPOSITION AND RESIN COMPOSITION INCLUDING SAME

CROSS-REFERENCE TO RELATED APPLICATION

This application is a National Stage Application of International Application No. PCT/KR2017/014486 filed on Dec. 11, 2017, which claims priority to and the benefit of Korean Patent Application No. 10-2016-0168320, filed on Dec. 12, 2016, the disclosure of which is incorporated herein by reference in its entirety.

TECHNICAL FIELD

The present invention relates to a plasticizer composition and a resin composition including the same.

BACKGROUND ART

Conventionally, a plasticizer forms an ester through a reaction between an alcohol and a polycarboxylic acid such as phthalic acid or adipic acid. In addition, in consideration of domestic and international regulations for phthalate-based plasticizers harmful to humans, there is ongoing research on plasticizer compositions that can replace phthalate-based plasticizers such as terephthalate-, trimellitate-, and other polymer-based plasticizers.

Generally, a plasticizer is used as a material for various products such as electric wires, pipes, flooring materials, wallpaper, sheets, artificial leather, tarpaulins, tape and food wrapping materials obtained in the related industries according to a processing method such as extrusion molding, injection molding or calendering after suitably adding resins such as polyvinyl chloride (PVC) and the like and various additives such as fillers, stabilizers, pigments, anti-fogging agents, and the like to provide various processing properties.

In the current plasticizer market, environmentally-friendly plasticizers are competitively developing in the related field due to environmental issues of phthalate plasticizers, and recently, new products for overcoming the inferiority of diisononyl terephthalate (DINTP), which are being used as environmentally-friendly plasticizers, in qualities such as plasticization efficiency, migration ability, and the like have been developed.

Accordingly, there is a need to develop a product which has properties superior to those of DINTP or a novel composition product including the same, and continuously conduct research on the most suitable technology for the use thereof as a plasticizer for vinyl chloride-based resins.

DISCLOSURE

Technical Problem

Therefore, during research on plasticizers, the present inventors verified a plasticizer composition capable of improving poor properties caused by structural limitations, which is environmentally friendly and can improve properties such as plasticization efficiency, absorption rate, migration ability, volatile loss, and the like when being used in combination with a resin composition, and thus completed the present invention.

That is, the present invention is directed to providing a plasticizer capable of improving properties such as absorption rate, plasticization efficiency, migration ability, tensile strength, elongation rate, volatile loss, and the like when the plasticizer is used as a plasticizer for a resin composition, a method of preparing the same, and a resin composition including the same.

Technical Solution

According to an embodiment of the present invention, there is provided a plasticizer composition which includes a terephthalate-based material in which alkyl groups bonded to a diester group have a weight average carbon number of greater than 7 and less than 9; and a monobenzoate-based material including one or more compounds represented by Chemical Formula 1 below, wherein a weight ratio of the terephthalate-based material and the monobenzoate-based material is 99:1 to 1:99.

[Chemical Formula 1]

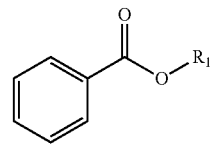

In Chemical Formula 1, $R_1$ is a C1 to C12 alkyl group.

According to another embodiment of the present invention, there is provided a resin composition which includes 5 to 150 parts by weight of the above-described plasticizer composition with respect to 100 parts by weight of one or more resins selected from the group consisting of ethylene vinyl acetate, polyethylene, polypropylene, polyketone, polyvinyl chloride, polystyrene, polyurethane, and a thermoplastic elastomer.

The resin composition may be applied in the preparation of one or more selected from the group consisting of electric wires, flooring materials, interior materials for automobiles, films, sheets, wallpaper, and tubes.

Advantageous Effects

A plasticizer composition according to an embodiment of the present invention is used for a resin composition so that environmentally friendly properties can be ensured and properties such as absorption rate, plasticization efficiency, migration ability, and volatile loss can be improved.

MODE FOR INVENTION

Hereinafter, the present invention will be described in further detail to help in understanding the present invention.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

The names of compounds used in this specification may be generic names and are named according to the substituents which characteristically bonded to each compound. Even though the name of the compound does not correspond to the generic name, it can be understood that it is named according to the substituent represented in the structure of the chemical formula.

The term "alkyl group" used herein can be understood to be linear or branched without other limitations other than a limitation in carbon number unless specifically mentioned otherwise.

According to an embodiment of the present invention, there is provided a plasticizer composition including a terephthalate-based material and a monobenzoate-based material.

The terephthalate-based material may have, for example, a terminal group independently selected from C4 to C10 alkyl groups.

The terephthalate-based material may be a single compound or a mixture of two or more compounds selected from the group consisting of di(2-ethylhexyl) terephthalate (DEHTP), diisononyl terephthalate (DINTP), diisodecyl terephthalate (DINTP), di(2-propylheptyl) terephthalate, diamyl terephthalate (DATP), dibutyl terephthalate (DBTP), butyl isononyl terephthalate (BJNTP), butyl(2-ethylhexyl) terephthalate (BEHTP), amyl isononyl terephthalate (AINTP), isononyl(2-propylheptyl) terephthalate (INPHTP), amyl(2-propylheptyl) terephthalate (APHTP), amyl(2-ethylhexyl) terephthalate (AEHTP), (2-ethylhexyl)(2-propylheptyl) terephthalate (EHPHTP), and (2-ethylhexyl)isononyl terephthalate (EHINTP).

More specifically, when the terephthalate-based material is a single compound, the terephthalate-based material may be di(2-ethylhexyl) terephthalate (DEHTP). Also, when the terephthalate-based material is a mixture, the terephthalate-based material may be a mixture of three types of terephthalate compounds, for example, a first mixture of di(2-ethylhexyl) terephthalate, butyl(2-ethylhexyl) terephthalate, and dibutyl terephthalate, a second mixture of diisononyl terephthalate, butyl isononyl terephthalate, and dibutyl terephthalate, a third mixture of di(2-ethylhexyl) terephthalate, (2-ethylhexyl)isononyl terephthalate, and diisononyl terephthalate, a fourth mixture of di(2-propylheptyl) terephthalate, isononyl(2-propylheptyl) terephthalate, and diisononyl terephthalate, a fifth mixture of di(2-ethylhexyl) terephthalate, (2-ethylhexyl)(2-propylheptyl) terephthalate, and di(2-propylheptyl) terephthalate, or a sixth mixture of diamyl terephthalate, amyl(isononyl) terephthalate, and diisononyl terephthalate.

Specifically, the first to sixth mixtures may have specific composition ratios, and each mixture may be prepared by mixing three components at 3.0 to 99.0 mol %, 0.5 to 96.5 mol %, and 0.5 to 96.5 mol %, respectively, in the order as written.

Based on weight, the composition ratio of three components may be 0.5 to 50 wt %; 3.0 to 70 wt %; and 0.5 to 85 wt %, respectively, and the weight ratio may be controlled by adjusting an amount of raw materials added in the reaction. More preferably, three components may be used at 0.5 wt % to 50 wt %, 10 wt % to 50 wt %, and 35 wt % to 80 wt %, respectively.

The composition ratio may be a mixing composition ratio produced by esterification or a composition ratio achieved by additionally mixing a specific compound, and the mixing composition ratio may be appropriately adjusted to achieve a desired property.

In particular, the terephthalate-based material needs to have a weight average carbon number of greater than 7 and less than 9, preferably 7.1 to 8.9, and more preferably 7.14 to 8.7.

The term "weight average carbon number" used herein refers to a value obtained by averaging the average carbon number of two alkyl groups bonded to a diester group of each terephthalate component by using the weight fraction of each terephthalate component in a terephthalate-based material including one or more terephthalates. For example, the weight average carbon number may be defined by Equation 1 below.

$$N_c = \sum_{i=1}^{n} C_i w_i \qquad \text{[Equation 1]}$$

In Equation 1, $N_c$ is a weight average carbon number, $C_i$ is the average carbon number of two alkyl groups bonded to a diester group of each terephthalate component, and $w_i$ is the weight fraction of each terephthalate component.

Specifically, when a terephthalate-based material includes first to $n^{th}$ components, the weight average carbon number may be the sum of a value obtained by multiplying an average carbon number ($C_1$) of two alkyl groups of a first component by the weight fraction ($w_1$) of the first component, a value obtained by multiplying an average carbon number ($C_2$) of two alkyl groups of a second component by the weight fraction ($w_2$) of the second component, and a value obtained by multiplying an average carbon number ($C_n$) of two alkyl groups of a $n^{th}$ component by the weight fraction ($w_n$) of the $n^{th}$ component.

For example, in the case of di(2-ethylhexyl) terephthalate, an average carbon number of two alkyl groups is 8, a weight fraction is 1 because di(2-ethylhexyl) terephthalate is the sole constituent component of a terephthalate-based material, and thus the weight average carbon number thereof is 8. Also, in the case of the first mixture, three components are included at 5 wt %, 40 wt %, and 55 wt %, respectively, and thus the weight average carbon number thereof is (0.05×4)+(0.4×6)+(0.55×8)=7.

As described above, when a weight average carbon number is within the above range, plasticization efficiency, an absorption rate, migration ability, and migration upon stress may be improved, which may result in the prevention or delay of deterioration in qualities which may occur due to migration in the use of a final resin product. Therefore, the lifespan of the product may be extended, and the possibility of contact with humans may also be reduced. In particular, when a weight average carbon number is 9 or more (e.g., a terephthalate-based material equivalent to or of a higher level than diisononyl terephthalate), plasticization efficiency and migration ability may be significantly deteriorated, and when a weight average carbon number is 7 or less, volatile loss and tensile strength may suffer significantly. Therefore, it is preferable that the terephthalate-based material have a weight average carbon number of greater than 7 and less than 9.

In addition, according to an embodiment of the present invention, there is provided a plasticizer composition including the terephthalate-based material and an additional monobenzoate-based material including one or more compounds. The monobenzoate-based material may be represented by Chemical Formula 1 below.

[Chemical Formula 1]

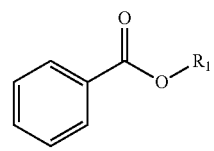

In Chemical Formula 1, $R_1$ is a C1 to C12 alkyl group.

Specifically, the compound represented by Chemical Formula 1 may be a monobenzoate-based material produced by esterification of benzoic acid or a benzoate and a $C_1$ to $C_{12}$ primary alkyl alcohol. The monobenzoate-based material may include one or more compounds represented by Chemical Formula 1, and $R_1$ in Chemical Formula 1 may be an alkyl group such as a C1 to C12 linear alkyl group or a C3 to C12 branched alkyl group, and is preferably a C4 to C10 alkyl group. In the case of the branched alkyl group, a branched chain bonded to a main chain may have 1 to 5 carbon atoms, preferably 1 to 3 carbon atoms.

Specifically, $R_1$ in Chemical Formula 1 may be a butyl group, an isobutyl group, a pentyl group, a hexyl group, a heptyl group, a 2-ethylhexyl group, an octyl group, a nonyl group, an isononyl group, a 2-propylheptyl group, a decyl group, or an isodecyl group, and is preferably a 2-ethylhexyl group, an isononyl group, or a 2-propylheptyl group.

According to an embodiment of the present invention, the plasticizer composition may include the terephthalate-based material and the monobenzoate-based material in a weight ratio of 99:1 to 1:99. An upper limit of the weight ratio range may be 99:1, 95:5, 90:10, 85:15, 80:20, 70:30, 60:40, or 50:50, and a lower limit thereof may be 1:99, 5:95, 10:90, 15:85, 20:80, 30:70, or 40:60. The weight ratio is preferably 95:5 to 20:80, more preferably 95:5 to 30:70, 95:5 to 40:60, or 95:5 to 50:50.

When the terephthalate-based material and the monobenzoate-based material are mixed for application to a plasticizer composition as in the present invention, environmental friendliness may be ensured, and properties such as absorption rate, plasticization efficiency, migration ability, and the like may also be improved.

As a method of preparing the plasticizer composition in the present invention, a blending method may be used, and the blending preparation method is as follows.

A terephthalate-based material and a monobenzoate-based material may be prepared and then blended at a specific ratio such as a weight ratio of 1:99 to 99:1 to prepare the plasticizer composition. In this case, each of the terephthalate-based material and the monobenzoate-based material may be a single compound or a mixture.

When the terephthalate-based material is a single compound, the terephthalate-based material may be prepared by direct esterification of terephthalic acid with 2-ethylhexyl alcohol.

The direct esterification may be performed by introducing terephthalic acid into an alcohol and then adding a catalyst thereto to induce a reaction under a nitrogen atmosphere; removing an unreacted alcohol and neutralizing an unreacted acid; and performing dehydration and filtration through distillation under reduced pressure.

The alcohol used in the blending preparation method may be used at 150 to 500 mol %, 200 to 400 mol %, 200 to 350 mol %, 250 to 400 mol %, or 270 to 330 mol % with respect to 100 mol % of the terephthalic acid.

Meanwhile, the catalyst used in the blending preparation method may be, for example, one or more selected from acid catalysts such as sulfuric acid, hydrochloric acid, phosphoric acid, nitric acid, p-toluenesulfonic acid, methanesulfonic acid, ethanesulfonic acid, propanesulfonic acid, butanesulfonic acid, alkyl sulfuric acids, and the like; metal salts such as aluminum lactate, lithium fluoride, potassium chloride, cesium chloride, calcium chloride, iron chloride, aluminum phosphate, and the like; metal oxides such as heteropoly acids and the like; natural/synthetic zeolites; cation- and anion-exchange resins; and organometallic compounds such as tetraalkyl titanates and polymers thereof, and the like. As a specific example of the catalyst, the tetraalkyl titanate may be used.

An amount of the catalyst to be used may vary according to the type thereof. For example, a homogeneous catalyst may be used at an amount of 0.01 to 5 wt %, 0.01 to 3 wt %, 1 to 5 wt %, or 2 to 4 wt % with respect to 100 wt % of a total weight of the reactants, and a heterogeneous catalyst may be used at an amount of 5 to 200 wt %, 5 to 100 wt %, 20 to 200 wt %, or 20 to 150 wt % with respect to the total weight of the reactants.

In this case, a reaction temperature may be in a range of 180 to 280° C., 200 to 250° C., or 210 to 230° C.

When the terephthalate-based material is a mixture, it may be prepared by producing terephthalate compounds by the above-described direct esterification and then mixing the compounds; or by using two or more alcohols to induce the direct esterification reaction.

Alternatively, when the terephthalate-based material is a mixture, it may be prepared by producing a terephthalate compound by trans-esterification of any one terephthalate compound selected from di(2-ethylhexyl) terephthalate and diisononyl terephthalate with any one alcohol selected from butyl alcohol and isobutyl alcohol.

The term "trans-esterification" used herein refers to a reaction between an alcohol and an ester as shown in Reaction Scheme 1, in which R" of the ester is interchanged with R' of the alcohol:

[Reaction Scheme 1]

According to an exemplary embodiment of the present invention, the trans-esterification may produce three types of ester compositions according to three cases in which an alkoxide of the alcohol attacks carbons of two ester (RCOOR") groups present in an ester-based compound; an alkoxide of the alcohol attacks carbons of one ester (RCOOR") group present in an ester-based compound; and there is no reaction between an alcohol and an ester group in an ester-based compound.

In addition, compared to acid-alcohol esterification, the trans-esterification does not cause water contamination and may solve problems caused by the use of an acidic catalyst because the reaction can be performed without a catalyst.

For example, the trans-esterification of di(2-ethylhexyl) terephthalate with butyl alcohol may produce a mixture of dibutyl terephthalate, butyl(2-ethylhexyl) terephthalate, and di(2-ethylhexyl) terephthalate, and the three terephthalates may be respectively produced at 0.5 wt % to 50 wt %, 3.0 wt % to 70 wt %, and 0.5 wt % to 85 wt %, preferably at 0.5 wt % to 50 wt %, 10 wt % to 50 wt %, and 35 wt % to 80 wt % with respect to a total weight of the mixture. Within the above range, a terephthalate-based material (mixture) which exhibits high processing efficiency, excellent processability, and an excellent absorption rate may be achieved.

In addition, a composition ratio of the mixture prepared by the trans-esterification may be controlled according to an addition amount of an alcohol(s).

The addition amount of an alcohol(s) may be 0.1 to 89.9 parts by weight, particularly 3 to 50 parts by weight, and more particularly 5 to 40 parts by weight with respect to 100 parts by weight of the terephthalate compounds.

As the addition amount of an alcohol(s) increases, a mole fraction of the terephthalate compounds involved in the trans-esterification increases, and thus a content of two produced terephthalate compounds in the mixture may increase. Accordingly, there may be a tendency in which the content of terephthalate compounds remaining unreacted decreases.

According to an embodiment of the present invention, a molar ratio of the terephthalate compound and the alcohol, which are reactants, is, for example, 1:0.005 to 5.0, 1:0.05 to 2.5, or 1:0.1 to 1.0. Within this range, an ester-based plasticizer composition which exhibits high processing efficiency and an excellent effect of improving processability may be achieved.

However, a composition ratio of the mixture of three types of terephthalate compounds is not limited to the above range, and may be modified by further adding any one of the three types of terephthalate compounds. In this case, a realizable composition ratio of the mixture is as described above.

According to an embodiment of the present invention, the trans-esterification may be performed at a temperature of 120 to 190° C., preferably 135 to 180° C., and more preferably 141 to 179° C. for 10 minutes to 10 hours, preferably 30 minutes to 8 hours, and more preferably 1 to 6 hours. Within the above temperature and time ranges, a terephthalate-based material, which is a mixture composed in a desired composition ratio, may be effectively achieved. Here, the reaction time may be calculated from the point of time to reach the reaction temperature after raising the temperature of the reactants.

The trans-esterification may be performed in the presence of an acidic catalyst or metal catalyst, which provides an effect of reducing a reaction time.

Examples of the acidic catalyst include sulfuric acid, methanesulfonic acid, p-toluenesulfonic acid, and the like, and examples of the metal catalyst include an organometallic catalyst, a metal oxide catalyst, a metal salt catalyst, and a metal itself.

A metal component of the metal catalyst may be, for example, any one or a mixture of two or more selected from the group consisting of tin, titanium, and zirconium.

The direct esterification and the trans-esterification may be applied in the preparation of the above-described monobenzoate-based material. When the monobenzoate-based material is prepared by the direct esterification or the trans-esterification as such, the same method as the above-described preparation of the terephthalate-based material may be applied.

According to another embodiment of the present invention, there is provided a resin composition including 100 parts by weight of a resin; and 5 to 150 parts by weight of the above-described plasticizer composition.

The resin may be one or more selected from the group consisting of ethylene vinyl acetate, polyethylene, polypropylene, polyketone, polyvinyl chloride, polystyrene, polyurethane, and a thermoplastic elastomer.

The plasticizer composition may be included at a content of preferably 5 to 100 parts by weight, 5 to 50 parts by weight or 50 to 150 parts by weight in some cases, and more preferably 30 to 60 parts by weight with respect to 100 parts by weight of the resin. In this case, a resin composition which is effective when applied as a compound, sheet, or plastisol may be provided.

For example, the plasticizer composition may be applied in the preparation of electric wires, flooring materials, interior materials for automobiles, films, sheets, wallpaper, or tubes.

EXAMPLES

Hereinafter, the present invention will be described in detail with reference to embodiments. However, the embodiments of the present invention may be modified in several different forms, and the scope of the present invention is not limited to the embodiments to be described below. The embodiments of the present invention are provided so that this disclosure will be thorough and complete, and will fully convey the concept of embodiments to those skilled in the art.

Preparation Example 1: Preparation of di(2-ethylhexyl) terephthalate (DEHTP)

498.0 g of purified terephthalic acid (TPA), 1,170 g of 2-ethylhexyl alcohol (2-EH) (a molar ratio of TPA:2-EH=1.0:3.0), and 1.54 g (0.31 part by weight with respect to 100 parts by weight of TPA) of a titanium-based catalyst (tetraisopropyl titanate (TIPT)) were added to a 3 L four-neck reaction vessel equipped with a cooler, a condenser, a decanter, a reflux pump, a temperature controller, a stirrer, and the like, and then the temperature of the reaction vessel was slowly raised up to about 170° C. The generation of produced water started at about 170° C., and esterification was performed at a reaction temperature of about 220° C. under an atmospheric pressure condition for about 4.5 hours while continuously introducing nitrogen gas and was terminated when an acid value reached 0.01.

After the reaction was completed, distillation extraction was performed under reduced pressure for 0.5 to 4 hours to remove unreacted raw materials. To reduce the level of the unreacted raw materials to a predetermined content level or less by removing the same, steam extraction was performed for 0.5 to 3 hours under reduced pressure using steam. A temperature of a reaction solution was cooled to about 90° C. to perform neutralization treatment using an alkaline solution. In this case, washing may be optionally performed. Thereafter, the reaction solution was dehydrated to remove water. A filtering material was introduced into the dehydrated reaction solution, stirred for a predetermined period of time, and then filtered, thereby finally obtaining 1,326.7 g of DEHTP (yield: 99.0%).

Preparation Example 2: Preparation of TP Mixture of DEHTP/BEHTP/DBTP 2,000 g of DEHTP obtained in Preparation Example 1 and 340 g (17 parts by weight with respect to 100 parts by weight of DEHTP) of n-butanol were added to a reaction vessel equipped with a stirrer, a condenser, and a decanter, and then trans-esterification was performed at a reaction temperature of 160° C. under a nitrogen atmosphere for 2 hours, thereby obtaining an ester-based plasticizer composition including dibutyl terephthalate (DBTP), butyl(2-ethylhexyl) terephthalate (BEHTP), and di(2-ethylhexyl) terephthalate (DEHTP) at 4.0 wt %, 35.0 wt %, and 61.0 wt %, respectively.

The ester-based plasticizer composition was subjected to mixed distillation to remove butanol and 2-ethylhexyl alcohol, thereby finally preparing a first mixture.

Preparation Example 3: Preparation of TP Mixture of DINTP/INEHTP/DEHTP

A mixture was prepared in the same manner as in Preparation Example 1 except that 2-ethylhexyl alcohol (2-EH) and isononyl alcohol (INA) were used as an alcohol at a ratio of 7:3 with respect to the total molar ratio. As a finally prepared product, a composition including diisononyl terephthalate (DINTP), (2-ethylhexyl)isononyl terephthalate (INEHTP), and di(2-ethylhexyl) terephthalate (DEHTP) at 8.5 wt %, 37.5 wt %, and 54.0 wt %, respectively, was obtained.

Preparation Example 4: Preparation of TP Mixture of DPHTP/EHPHTP/DEHTP

A composition including di(2-propylheptyl) terephthalate (DPHTP), (2-ethylhexyl)(2-propylheptyl) terephthalate (EHPHTP), and di(2-ethylhexyl) terephthalate (DEHTP) at 7.0 wt %, 35.0 wt %, and 58.0 wt %, respectively, was prepared in the same manner as in Preparation Example 3 except that 2-propylheptanol was used instead of isononyl alcohol (INA).

Preparation Example 5: Preparation of TP Mixture of DPHTP/INPHTP/DINTP

A mixture was prepared in the same manner as in Preparation Example 1 except that isononyl alcohol (INA) and 2-propylheptyl alcohol were used as an alcohol at a ratio of 7:3 with respect to the total molar ratio. As a finally prepared product, a composition including di(2-propylheptyl) terephthalate (DPHTP), isononyl(2-propylheptyl) terephthalate (INPHTP), and diisononyl terephthalate (DINTP) at 4.0 wt %, 35.0 wt %, and 61.0 wt %, respectively, was obtained.

Preparation Example 6: Preparation of Diheptyl Terephthalate

Diheptyl terephthalate was obtained in the same manner as in Preparation Example 1 except that n-heptanol was used instead of 2-ethylhexyl alcohol.

Preparation Example 7: Preparation of 2-Ethylhexyl Monobenzoate 500 g of benzoic acid (BA), 1,600 g of 2-ethylhexyl alcohol (2-EH) (a molar ratio of BA:2-EH=1:3), and 1.3 g (0.26 part by weight with respect to 100 parts by weight of BA) of a titanium-based catalyst (tetraisopropyl titanate (TIPT)) were added to a 3 L four-neck reaction vessel equipped with a cooler, a condenser, a decanter, a reflux pump, a temperature controller, a stirrer, and the like, and then the temperature of the reaction vessel was slowly raised up to about 170° C. The generation of produced water started at about 170° C., and esterification was performed at a reaction temperature of about 220° C. under an atmospheric pressure condition for about 4.5 hours while continuously introducing nitrogen gas and was terminated when an acid value reached 0.01.

After the reaction was completed, distillation extraction was performed under reduced pressure for 0.5 to 4 hours to remove unreacted raw materials. To reduce the level of the unreacted raw materials to a predetermined content level or less by removing the same, steam extraction was performed for 0.5 to 3 hours under reduced pressure using steam. A temperature of a reaction solution was cooled to about 90° C. to perform neutralization treatment using an alkaline solution. In this case, washing may be optionally performed. Thereafter, the reaction solution was dehydrated to remove water. A filtering material was introduced into the dehydrated reaction solution, stirred for a predetermined period of time, and then filtered, thereby finally obtaining 689 g of 2-ethylhexyl benzoate (yield: 98%).

Preparation Example 8: Preparation of Isononyl Monobenzoate 730 g of isononyl benzoate (yield: 98%) was obtained in the same manner as in Preparation Example 7 except that isononyl alcohol was used instead of 2-ethylhexyl alcohol.

Preparation Example 9: Preparation of 2-Propylheptyl Monobenzoate 771 g of 2-propylheptyl benzoate (yield: 98%) was obtained in the same manner as in Preparation Example 7 except that 2-propylheptyl alcohol was used instead of 2-ethylhexyl alcohol.

The compounds prepared in Preparation Examples 1 to 9 were used to prepare plasticizer compositions as listed in Table 1 below.

TABLE 1

| | Terephthalate-based material | | | |
|---|---|---|---|---|
| | Compound | Weight average carbon number | Benzoate | Mixing ratio |
| Example 1 | DEHTP | 8 | Preparation Example 7 | 9:1 |
| Example 2 | DEHTP | 8 | Preparation Example 7 | 8:2 |
| Example 3 | DEHTP | 8 | Preparation Example 9 | 7:3 |
| Example 4 | DBTP/BEHTP/DEHTP | 7.14 | Preparation Example 9 | 8:2 |
| Example 5 | DINTP/EHINTP/DEHTP | 8.18 | Preparation Example 8 | 6:4 |
| Example 6 | DEHTP/EHPHTP/DPHTP | 8.43 | Preparation Example 7 | 5:5 |
| Comparative Example 1 | DINTP | 8 | — | — |
| Comparative Example 2 | — | — | Preparation Example 7 | — |
| Comparative Example 3 | DINTP | 9 | Preparation Example 8 | 9:1 |
| Comparative Example 4 | DPHTP | 10 | Preparation Example 9 | 7:3 |
| Comparative Example 5 | DHTP | 7 | Preparation Example 7 | 5:5 |
| Comparative Example 6 | DINTP/INPHTP/DPHTP | 9.785 | Preparation Example 8 | 8:2 |

Experimental Example 1: Specimen Preparation and Performance Evaluation

The plasticizers according to Examples 1 to 6 and Comparative Examples 1 to 6 were used as experimental specimens. For specimen preparation, referring to ASTM D638, 40 parts by weight of each of the plasticizers and 3 parts by weight of a stabilizer (LOX 912 NP) were mixed with 100 parts by weight of PVC (LS100S) in a mixer, and the resulting mixture was then subjected to roll-milling at 170° C. for 4 minutes and pressed for 2.5 minutes (low pressure) and 2 minutes (high pressure) at 180° C. using a press, thereby manufacturing 1 T and 3 T sheets. Each specimen was subjected to tests for the following properties.

<Test Items>

Hardness

According to ASTM D2240, Shore hardness (Shore "A" and Shore "D") was measured at 25° C. under 3 T and 10 s conditions.

Tensile Strength

According to ASTM D638, each specimen was pulled at a cross head speed of 200 mm/min (1 T) using a tester, U.T.M, (Manufacturer; Instron, Model No.; 4466), and a point at which the specimen was broken was then determined. The tensile strength was calculated as follows:

Tensile strength $(kgf/cm^2)$=Load value $(kgf)$/Thickness $(cm)$×Width $(cm)$

Measurement of Elongation Rate

According to ASTM D638, each specimen was pulled at a cross head speed of 200 mm/min (1 T) using the U.T.M, and a point at which the specimen was broken was then determined. The elongation rate was calculated as follows:

Elongation rate (%)=Length after elongation/Initial length×100

Measurement of Migration Loss

A specimen having a thickness of 2 mm or more was obtained according to KSM-3156, glass plates were attached to both sides of the specimen, and then a load of 1 kgf/cm² was applied thereto. The specimen was placed in a hot-air convection oven (80° C.) for 72 hours, then taken out of the oven, and cooled at room temperature for 4 hours. Thereafter, the glass plates attached to both sides of the specimen were removed, weights of the specimen before and after being placed in the oven along with the glass plates were measured, and thus a migration loss was calculated by the equation as follows.

Migration loss (%)={(Initial weight of specimen at room temperature−Weight of specimen after being placed in oven)/Initial weight of specimen at room temperature}×100

Measurement of Volatile Loss

The prepared specimen was processed at 80° C. for 72 hours, and then a weight of the specimen was measured.

Volatile loss (%)=Initial weight of specimen−(Weight of specimen after being processed at 80° C. for 72 hours)/Initial weight of specimen×100

Measurement of Migration Upon Stress (Loop)

According to ASTM D3291, the prepared specimen was placed in a constant temperature and humidity bath under a humidity of 50% at 23° C. for 168 hours, and then a migration degree of the plasticizer was evaluated on a scale of 0 (excellent) to 3 (poor).

Measurement of Absorption Rate 400 g of PVC (LS100S commercially available from LG Chem) was put into a planetary mixer preheated to 80° C., and stirred at a rate of 60 rpm. After 5 minutes, 200 g of a prepared plasticizer was put into the mixer, and then a change in a torque occurring during stirring was observed to determine the time taken to completely mix the plasticizer with a resin.

TABLE 2

| | Hardness (Shore A) | Tensile strength (kg/cm²) | Elongation rate (%) | Migration loss (%) | Volatile loss (%) | Migration upon stress (grade 0 to 3) |
|---|---|---|---|---|---|---|
| Example 1 | 93.8 | 209.3 | 291.7 | 2.20 | 1.41 | 0.5 |
| Example 2 | 93.6 | 208.1 | 288.7 | 2.31 | 2.50 | 0 |
| Example 3 | 93.6 | 211.8 | 290.4 | 2.68 | 2.97 | 0 |
| Example 4 | 91.1 | 206.2 | 295.6 | 2.70 | 2.65 | 0 |
| Example 5 | 92.7 | 207.4 | 286.3 | 3.35 | 3.14 | 0 |
| Example 6 | 91.3 | 206.9 | 290.2 | 3.21 | 3.02 | 0 |
| Comparative Example 1 | 96.2 | 210.6 | 290.0 | 2.98 | 1.10 | 2.0 |
| Comparative Example 2 | 84.0 | 176.2 | 260.8 | 6.40 | 14.5 | 1.0 |
| Comparative Example 3 | 97.0 | 208.0 | 288.3 | 3.37 | 1.13 | 2.0 |
| Comparative Example 4 | 97.1 | 207.6 | 289.1 | 4.21 | 0.67 | 1.0 |
| Comparative Example 5 | 88.6 | 189.7 | 271.0 | 5.33 | 11.2 | 0.5 |
| Comparative Example 6 | 97.3 | 211.3 | 277.6 | 3.58 | 0.89 | 1.0 |

Referring to Table 2, it can be confirmed that the plasticizers according to Examples 1 to 6 exhibited an improvement in all properties compared to the plasticizers according to Comparative Examples 1 to 6. That is, it can be confirmed that since the properties were generally excellent without a degradation of any particular property, when the plasticizer according to the present invention is applied to a resin product, a resin having excellent properties can be prepared. In particular, it can be confirmed that migration upon stress was significantly reduced compared to Comparative Examples 1 to 6, and migration loss and volatile loss were also significantly improved.

Specifically, it can be seen that in the case of Comparative Examples 1 and 2, in which a terephthalate-based material and benzoate were not used in combination, application to a product is difficult because a deviation in properties of two compounds is significant. For example, it can be confirmed that Comparative Example 1 exhibited significantly poor plasticization efficiency and high degree of migration upon stress, and Comparative Example 2 exhibited a significantly low level of volatile loss, elongation rate, and tensile strength and thus is not appropriate for use.

In addition, it can be confirmed that Comparative Example 3, in which a terephthalate-based material having a weight average carbon number of 9 without being adjusted to 8.9 or less was selected, exhibited an about 5% increase in hardness, which indicates a decrease in plasticization efficiency, and also exhibited a significant difference in migration resistance against stress compared to Examples 1 to 6. Furthermore, it can be confirmed that Comparative Examples 4 and 6, in which terephthalate based materials having weight average carbon numbers of 10 and 9.785, respectively, were used, exhibited improved migration resistance against stress compared to Comparative Example 3, but still exhibited poor migration resistance compared to Examples 1 to 6, and exhibited poorer migration loss. Also, it can be confirmed that Comparative Example 6 exhibited a degraded elongation rate.

It can be confirmed that Comparative Example 5, in which a terephthalate-based material having a weight average carbon number of 7 was used, exhibited a significantly poor level of tensile strength, elongation rate, migration loss, and volatile loss. In particular, it can be seen that Comparative Example 5 exhibited a significant difference from Example 4 in which a terephthalate-based material having a weight average carbon number of 7.14 was used.

From these results, it can be confirmed that the use of the plasticizer composition according to the present invention results in significantly improved migration resistance against stress, low migration loss and low volatile loss, and improved tensile strength and an improved elongation rate.

The invention claimed is:

1. A plasticizer composition comprising:
   a terephthalate-based material in which alkyl groups bonded to a diester group have a weight average carbon number of 7.1 to 8.5; and
   a monobenzoate-based material,
   wherein a weight ratio of the terephthalate-based material and the monobenzoate-based material is 90:10 to 50:50,
   wherein the terephthalate-based material is one of:
     a first mixture of di(2-ethylhexyl) terephthalate, butyl (2-ethylhexyl) terephthalate, and dibutyl terephthalate,
     a second mixture of di(2-propylheptyl) terephthalate, isononyl(2-propylheptyl) terephthalate, and diisononyl terephthalate, or
     a third mixture of di(2-ethylhexyl) terephthalate, (2-ethylhexyl)(2-propylheptyl) terephthalate, and di(2-propylheptyl) terephthalate, and
   wherein the monobenzoate-based material is one of:
     2-ethylhexyl monobenzoate,
     isononyl monobenzoate, or
     2-propylheptyl monobenzoate.

2. A resin composition comprising:
   100 parts by weight of a resin; and
   5 to 150 parts by weight of the plasticizer composition of claim 1.

3. The resin composition of claim 2, wherein the resin is one or more selected from the group consisting of ethylene vinyl acetate, polyethylene, polyketone, polypropylene, polyvinyl chloride, polystyrene, polyurethane, and a thermoplastic elastomer.

4. A material for producing an article comprising a resin composition of claim 2, wherein the article is one or more selected from the group consisting of electric wires, flooring materials, interior materials for automobiles, films, sheets, wallpaper, and tubes.

* * * * *